Jan. 7, 1958     H. SCHWARZKOPF ET AL     2,818,850
CUT OFF BLADES FOR ABRASIVE BODIES AND THEIR PRODUCTION
Filed July 6, 1955     2 Sheets-Sheet 2
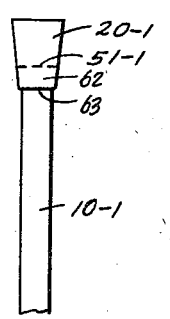
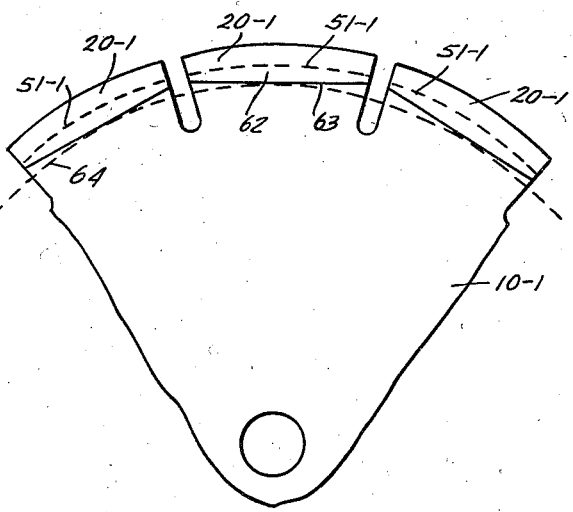
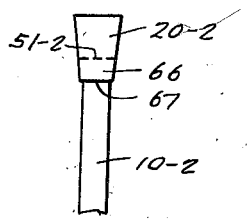
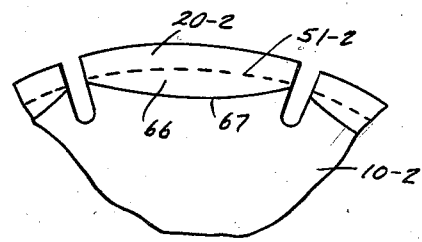
INVENTORS
HENRY SCHWARZKOPF
JOHN G. VAN OTTERLOO
BY
ATTORNEYS

United States Patent Office 2,818,850
Patented Jan. 7, 1958

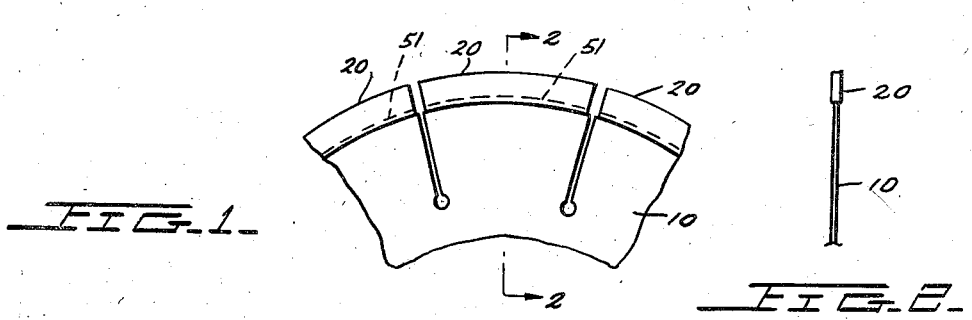
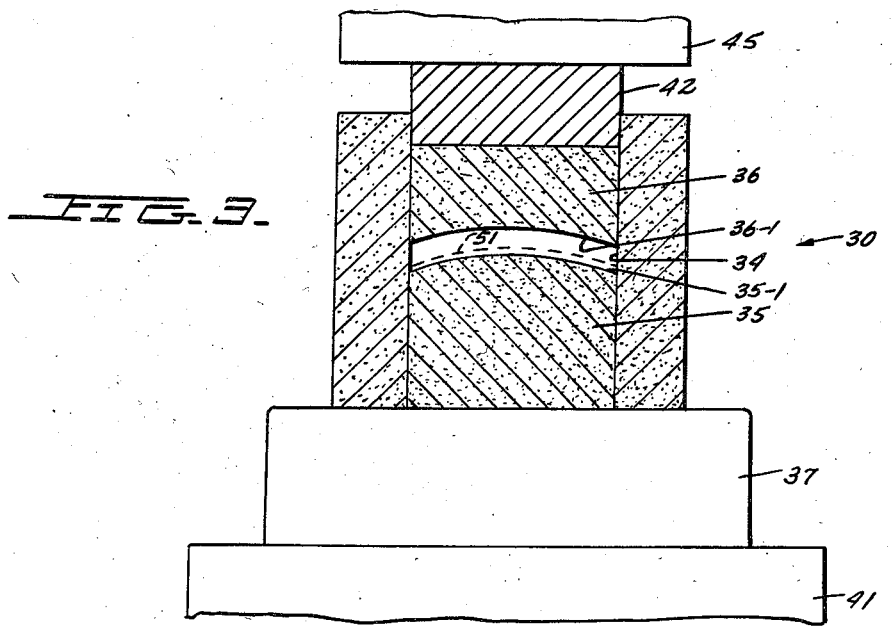
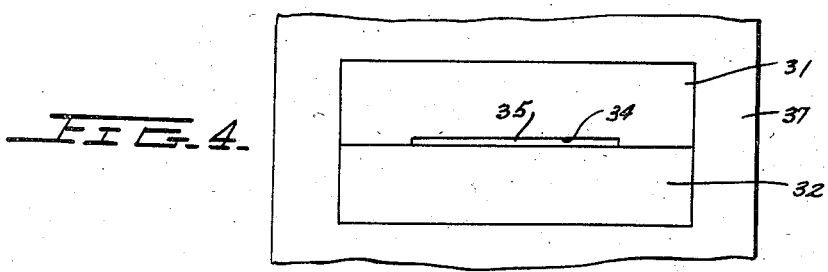

2,818,850
CUT OFF BLADES FOR ABRASIVE BODIES AND THEIR PRODUCTION

Henry Schwarzkopf, Pelham Manor, and John G. Van Otterloo, Pleasantville, N. Y., assignors to Consolidated Diamond Tool Corporation, Yonkers, N. Y., a corporation of New York Application July 6, 1955, Serial No. 520,221

9 Claims. (Cl. 125—15)

This invention relates to improvements in diamond-containing, cut-off blades and the process of making such blades. This application is a continuation-in-part of applicants' co-pending application Serial No. 444,588, filed July 20, 1954, now abandoned.

At present, disks for cutting abrasive bodies are formed of a strong circular sheet metal disk having a thickness of 1/16 to 3/16" which has joined to the periphery thereof, a plurality of cutting segments of similar slightly greater thickness. These cutting segments consist of diamond dust embedded in or bonded with bronze (copper-tin alloy) or a nickel copper alloy such as "Monel" metal. For example, typical prior art cutting segments are made by mixing powdered bronze and diamond dust, which mixture is compacted under 1–10 t. s. i. and sintered at 800–1000° C. yielding a segment which is subsequently welded or brazed to the metal disk or wheel. The segments are usually somewhat thicker than the metal wheel to which they are welded.

In the past, many difficulties have been encountered with such prior art cut-off disks and their manufacture. The metal powder has to be chosen so that when compacted with diamond powder and sintered, the shrinkage in sintering is at most approximately 1 to 2% as otherwise deformation of the curved segments and cracking will occur because the diamond powder will resist shrinkage. This makes the choice of the bonding or embedding alloy critically limited.

Because of these limitations, it has been necessary to provide a series of such cutting disks of different diamond content and/or of different radial depths for cutting abrasive bodies of different hardness and different abrasive characteristics. Thus, a wheel with one type of cutting segment is provided for cutting relatively soft materials such as plastics, terra cotta, tufa stone, magnesite brick, etc.; another one is provided for cutting somewhat harder products such as common bricks, limestone, slate mica schist, glazed tile, etc., and a further one is provided for still harder products such as fused alumina glass, marble, porcelain, silicon carbide products, etc.

Among the objects of this invention is to provide an accurately formed segment for cutting wheels which will not crack due to shrinkage or strains caused by shrinkage.

Among other objects of the invention is to provide a cutting segment which is suitable for cutting materials of all degrees of hardness.

Another difficulty in connection with the formation of such segments has been that the products have limited life owing to the fact that the diamond dust is not firmly bonded in the embedding alloy resulting in the loss of diamond dust before the said diamond dust is consumed by wear.

Among other objects of the invention is to provide a grinding or cutting segment containing embedded diamond dust in which the latter is firmly bonded to the embedding material.

In practice, very good results are obtained with cutting wheels formed of a circular metal disk with an annular array of cutting segments of the invention having a thickness of about 1/16" to 3/16" and a radius of about 3/8" to 1/2" which are secured with their inner edge by brazing to the edge of the metal disk which is slightly thinner in thickness than the cutting segments. The same disk with the same cutting segments are fully effective for cutting all kinds of hard abrasive materials irrespective of their hardness, including bodies of cemented silicon carbide, porcelain, marble, alumina glass as well as the less hard tiles, slate, limestone, bricks, and also much softer materials such as terra cotta, magnesite bricks, and plastics. The powder mixture from which the cutting segments of the invention are made consists of 30–70% of the tungsten carbide and the balance cobalt and/or nickel to which is added 2 to 6.5% of the diamond dust. A very satisfactory composition consists of 40% of tungsten carbide, 60% of cobalt to which is added 2 to 6.5% of diamond dust.

The composition is hot-pressed in a suitable hot pressing die such as a graphite die. In loading the die cavity shaped to provide the segment desired, the die cavity is loaded on the convex side with a thin layer, about 1/16" thick, the tungsten carbide mixed with cobalt or nickel powder only followed by loading with a similar powder mixture which also contains the diamond powder. This makes it possible to grind the concave side of the segment and obtain a perfect fit onto the metal wheel. A satisfactory procedure is to hot press in a graphite die while heated to from 1400° C.–1650° C. at a pressure of 1/2 to 2 t. s. i. At 1650° C. only 30–45 seconds are required for the production of the desired hard segment whereas at lower temperatures longer periods and higher pressures are required.

One phase of this invention is based on the discovery that diamonds of 20–40 mesh size, for example, embedded in a matrix which is substantially a tungsten carbide-cobalt or tungsten carbide-nickel matrix (containing 30–70% of tungsten carbide and the remainder cobalt and/or nickel) provides a cutting segment which is suitable and durable for cutting any of the various hard materials mentioned above.

A second phase of the invention relates to the provision of a cutting segment which is substantially free of diamond particles in the region which is to be brazed or otherwise united to the steel disk whereby to avoid many brazing difficulties.

A third phase of the invention relates particularly to circular saws which are especially adapted for cutting green concrete although these saws are also advantageous for other cutting jobs. In the grinding of green concrete especially it has been found that there is a tendency for the steel disk core to wear away at or adjacent the region where the steel of the disk and the cutting segment are united. Thus, eventually the cutting segment separates from the core disk due to the reduced area of contact between the united surfaces. This third phase of the invention is based on the discovery that the abrasive wearing away of the steel core disk at the area adjacent the cutting segment is prevented if the inside surface of the cutting disk is not concentric with the cutting surface of the segment. In practice, it has been found very satisfactory to make the inside of the segment with a straight or convex edge instead of with the usual concentrically concave surface.

The foregoing and other objects of the invention will be best understood from the following description of a specific exemplification thereof, reference being had to the accompanying drawings wherein Fig. 1 is a view of a portion of a finished grinding wheel made according to the invention;

Fig. 2 is a cross-sectional view taken on line 2—2 of Fig. 1;

Fig. 3 is a side view partly in cross-section of a mold employed to make the segment of the invention;

Fig. 4 is a top view of the mold of Fig. 3;

Fig. 5 is a partial side view of a cutting disk made with a modified form of segment;

Fig. 6 is an enlarged radial cross-sectional view showing the points of wear in a grinding wheel like that of Fig. 1;

Figs. 7 and 8 are views similar to Figs. 5 and 6 of another modified form of the invention.

Figs. 1 and 2 show a finished grinding wheel or disk of the invention which comprises the central disk 10 of strong metal, such as steel, to which are attached a plurality of grinding or cutting segments 20 made according to the invention. The central metal disk 10 is somewhat narrower than the segments 20 (Fig. 2). The central metal disk 10 is of conventional design. In such disks, the grinding segments 20 overhang the metal disk 10 on the order of about 1/32" on each side or in other words, the segment is about 1/16" thicker than the metal disk. As an example, in a cutter where the drive disk 10 has a thickness of about 3/32" (which is a practical value for the drive disk) a very satisfactory thickness for the segments is 5/32".

In accordance with the invention, the cutting segments of abrasive cutting wheels of the type described above are formed by hot pressing an intimate powder mixture containing 35 to 65% of tungsten carbide, and about 65 to 35% of cobalt, and/or nickel, the mixture also containing diamond dust which forms 2 to 6.5% of the total ingredients of the composition. (Throughout the specification and claims all proportions are given in weight unless otherwise specifically stated.)

The cutting segment is formed in the hot pressing die in such a way that its inner edge region which is united, as by brazing, to the periphery of the cutting disk has a segment section which is free of diamond dust so that it may be ground to a close fit against the steel disk and simplify the problem of forming a strong junction between them.

Figs. 3 and 4 show one form of a hot pressing die 30 for forming cutting segments of the invention. The hot pressing die 30 comprises a die structure formed of two generally rectangular die blocks 31, 32 of graphite and two plug inserts 35, 36, likewise of graphite, positioned to fit into a longitudinal die channel 34 the die cavity 35 having the shape of the desired cutting segment 20. The lower die plug insert 35 is shown positioned in the lower portion of the die cavity channel 34 and is backed up by a backing block 37 which is likewise of graphite and held positioned against a water cooled metallic press member 41 by which the required pressure is applied to the die plug insert 35.

The other graphite plug insert 36 is movably positioned in the upper portion of the die cavity channel 34 for movement under the pressure applied by the movable pressure plug 42 to which pressure is applied by the upper cooperating press member 45 which is of metal and arranged to be water cooled.

The lower graphite plug insert 35 is provided with an upper convex die cavity surface 35–1 which corresponds to the concave surface of the cutting segment 20. The lower surface of the upper die plug insert 36 is similarly provided with a downwardly facing convex die cavity surface 36–1 which corresponds to the upper convex surface of the cutting segment 20. The two flat side walls of the die blocks 31 and 32 facing the sides of the die cavity 35 shape the flat side walls of the cutting segment 20. The pressure plug 42 may be formed with advantage of a hard metal such as molybdenum or tungsten and it is arranged to have a sliding fit in the longitudinal channel 34 of the die cavity for pressing the upper graphite plug insert 36 in the direction toward the lower plug insert 35 when a pressure is applied to the two pressure members 41, 45 of the hot press.

The two pressure members 41, 45 are part of a conventional hot press and are designed to apply pressure to the opposite plug inserts 35, 36 of the graphite die 30 and also to provide electric conducting connections and send heating currents by way of the two graphite plug inserts 35, 36, through the die structure 30 and heat the contents of the die cavity 35 to the desired temperature when performing the hot pressing operation.

In producing cutting segments 20 of the invention by the hot pressing die of the type shown in Figs. 3 and 4, the upper press member 45 with the pressure plug 42 are lifted and removed from the die structure 30 and the upper block insert 36 is likewise removed. Thereupon, a mixture of tungsten carbide powder and cobalt powder free from diamond dust is deposited on the bottom surface 35–1 of the die cavity 35 to form a thin powder mixture layer 51 which is free from diamond dust. Over the bottom layer 51 of the mixture of tungsten carbide and cobalt powder is deposited a higher body portion of a powder mixture consisting of tungsten carbide, cobalt and diamond dust in the proportions herein described which are to form the main working part of the cutting segment 20. The proper measured amounts of the two powder mixtures which are to be deposited in the die cavity 35 are determined before filling the die cavity with them in the manner described above. After thus filling the die cavity 35 with the two layers of properly proportioned different powder mixtures, the upper graphite block insert 36 is inserted into the die cavity channel 34 followed by the insertion of the pressure plug 42 and the application of a pressure and heating current cycle to the die for heating and compressing the powder mixture and forming out of it, within the die cavity 35, the desired cutting segment 20.

By way of a specific example, a highly effective cutting segment of the invention may be produced as follows:

There is prepared a bottom layer mixture consisting of an intimate mixture of 40% of powdered tungsten carbide (WC) and 60% of powdered cobalt. There is also prepared the main body mixture consisting of a similar intimate mixture of 40% of powdered tungsten carbide (WC) and 60% of powdered cobalt to which is admixed diamond dust at the rate of 32 carats (6.4 grams) of diamond dust per 1 cubic inch, or 0.1165 gram diamond dust per 3.6 grams, of the mixture of tungsten carbide and cobalt powder. Into the die cavity 35 of the graphite die 30 there is first deposited on the upwardly facing convex cavity surface 35–1 a thin bottom layer 51 of the bottom layer mixture of powdered tungsten carbide and powdered cobalt which is free of any diamond dust, to provide a layer thickness of about 1/16". Thereafter, there is deposited over the bottom layer mixture 51 the main body powder mixture containing the proper proportion of diamond dust to the greater radial height desired for the cutting part of the cutting segment 20. The upper graphite plug insert 36 is then placed with its bottom concave die cavity surface 36–1 into the die channel 34 followed by placing thereover the hard pressure plug 42. Thereupon, the so completed hot press assembly 30 is placed between the pressure members 41 and 45 of the hot press and the hot pressing operation is applied to the two powder mixture fillings in the die cavity 35 with a pressure of 1/2 to 2 t. s. i. while heating it to a temperature of 1450° to 1500° C. for about 1/2 to 1 minute.

After performing the hot pressing operation, the die assembly 30 is opened and the completed hard cutting segment 20 is removed from the die cavity space 35. The concave bottom surface of the bottom region 51 of the cutting segment 20 which is free from diamond dust is then ground to provide an exact fit against the circular edge of the steel disk 10, and each completed cutting segment 20 is joined with its concave bottom surface to the periphery of the cutting disk 30, as by brazing, into a strong integral cutting wheel or blade.

The wheel of the type described above may be employed to cut hard as well as relatively soft materials, fire bricks as well as cinder blocks, for example. Such materials of various degrees of hardness are cut economically with this cutting wheel or blade whereas they could not be cut economically with prior art blades due to lack of bond between the diamond dust and bonding metal of the prior art. The life of the cutting blade of the invention made as above is at least three times that of the best prior art blades. In the segments made according to the invention, there is no substantial loss of diamonds other than by wear as the diamonds are fully embedded in the tungsten carbide cobalt composition, and it appears that this mixture comprising tungsten carbide and cobalt has an affinity for the diamond dust.

Cutting disks of the invention of the type described above have a life at least three times longer than that of prior art cutting disks. In the course of the much longer useful life of the cutting wheels of the invention, difficulties have been encountered, particularly in applications such as cutting of green or uncured concrete, with the metallic support or drive disk being worn out at the region of its circular junction edge to inner edge regions of the diamond containing cutting segments. This wear is caused by the abrasive action of loose abrading particles on the rotating circular junction edge region of the metallic drive disk which sharpens and thins the drive disk at the critical circular junction periphery to which the cutting segments are brazed. This sharpening and thinning of the metallic periphery of the drive disk weakens the brazing junction to such an extent as to cause premature breaking off of the cutting segments from the drive disk. This difficulty has heretofore made it impossible to operate cutting disks of the dimensions described above for cutting of green concrete for more than a maximum cut of 1250 feet of concrete.

According to the invention, the foregoing difficulties are overcome by forming the inner junction edge between the cutting segments and the drive disk with at least one eccentric edge irregularity so that rotation of cutting wheel causes the eccentric inner edge irregularity of at least one cutting segment to radially displace the accumulated loose abrasive particles away from the main junction region between the cutting segments and the drive disk.

The eccentric irregularities of the inner junction region of the cutting segment to the drive disk may be provided in a variety of ways. This may be done, for instance, by making the inner junction edge of the cutting segments in the form of several straight chord or straight edge portions which are joined to a correspondingly shaped edge segment of the drive disk in the same manner as explained in connection with Figs. 1–4. Alternatively, the inner junction edge of the cutting segment may be given the shape of a straight or plane surface edge. As a further alternative, the inner junction edge of the cutting disk is given a radially inward convex shape.

Figs. 5 and 6 show one form of a cutting wheel of the invention having cutting segments provided with an eccentrically irregular junction edge along which it is joined to the drive disk. It comprises a drive disk 10–1 similar to that of Figs. 1 and 2 having secured to its periphery a plurality of diamond dust containing abrading segments 20–1 made in the way similar to that explained in connection with Figs. 1 and 2. In accordance with the invention, the inner edge region 62 of each abrading segment 20–1, which is free of diamond dust, is provided with a radially eccentric junction surface 63 along which it is joined to the correspondingly shaped junction edge of the cutting segment 20–1. The abrading segment 20–1 of Figs. 5 and 6 contains diamond dust only in its radially outward region shown bounded on the inner side by the generally circular bounding line 51–1. The eccentrically irregular inner edge region 62 of each cutting segment 20–1 is formed by a straight chord or edge 63 which is perpendicular to the center radius of each segment, thus providing a simple junction connection between each cutting segment 20–1 and the facing edge of the drive disk 10–1. Rotation of abrading segments 20–1 having inner straight edge junctions 63 to the drive disk 10–1 will cause the loose refractory particles accumulating below the junction edge 63 of the individual abrading segments 20–1 to be radially displaced by the eccentrically irregular segment edge 63 towards a region shown bounded on its radially outward side in Fig. 6 by the dash line circle 64. As a result, the metallic drive disk 10–1 will not be subjected to wear along its entire peripheral outer edge, but only at an inward region, which is displaced radially from its outer edge, thus preserving for a long useful life the main brazed edge region of the drive disk 10–1 along which it is joined to the straight inner edge of its individual abrading segment 20–1.

Figs. 7 and 8 show a modified form of grinding wheel of the invention wherein the diamond-containing abrading segments 20–2 are joined to the metallic drive disk by an eccentrically irregular inner junction edge region 66.

The cutting segments of Figs. 7 and 8 has diamond dust embedded therein only in its outer region extending beyond the circular boundary line 51–2.

In the abrading wheel of Figs. 7 and 8, the individual abrading segments 20–2 have an eccentrically shaped inward junction edge region 66 provided with a junction surface 67 which is convex in a radially inward direction along which it is joined to the corresponding junction edge surface of the inner drive disk 10–2 of steel or like other similar metal. As in the case of the wheel of Figs. 5 and 6, rotation of the wheel shown in Figs. 7 and 8 will cause the eccentrically irregular inner junction edge 67 of its cutting segments 20–2 to displace loose abrasive particles in radially inward direction thereby prolonging the useful life of the wheel and reducing in a very material way the abrading action of the loose abrasive particles on the rotating junction region of the drive disk 10–2 along which it is joined to the inner edge regions of its cutting segments 20–1.

The segments 20–1 and 20–2 of Figs. 5 and 7 respectively are made by a mold similar to that of Fig. 3 but with the appropriately shaped lower mold member 35.

The features and principles underlying the invention described above in connection with specific exemplifications will suggest to those skilled in the art many other modifications thereof. It is accordingly desired that the appended claims will not be limited to any specific features or details shown and described in connection with the exemplifications thereof.

We claim:

1. In a cutting disk for cutting hard abrasive material having a strong inner drive disk and separated arcuate cutting segments having inner edge surfaces united to successive peripheral edge regions of said disk, each segment being about $\frac{1}{16}$ to $\frac{3}{16}$ inch thick, and having a main radially extending segmental cutting section consisting of 2% to 6.5% of diamond dust held dispersed and bonded in a hard material consisting of 35% to 55% tungsten carbide and the balance of 45–65% consisting essentially of a metal selected from the group consisting of nickel and cobalt and mixtures thereof.

2. In a cutting disk as claimed in claim 1, said metal consisting essentially of cobalt.

3. In a cutting disk as claimed in claim 1, the radially inward region of each of said cutting segments which is joined to the peripheral edge of said inner disk being substantially free of diamond dust.

4. In a cutting disk for cutting hard abrasive material having a strong inner drive disk and separated tooth-like arcuate cutting segments having inner edge surfaces united to successive peripheral edge regions of said disk, each segment being about 1/16 to 3/16 inch thick, and having a main radially extending segmental cutting section consisting of 2% to 6.5% of diamond dust held dispersed and bonded in a hard material consisting of 35% to 55% tungsten carbide and the balance of 45–65% consisting essentially of a metal selected from the group consisting of nickel and cobalt and mixtures thereof, the thickness of the disk being less than that of the transverse thickness of said cutting segments, integral inner edge surface portions of consecutive arcuate sections of at least one of said segments having different radial dimensions thereby giving the inner edge surface of the one segment at least one eccentric edge irregularity with respect to said drive disc so that rotation of said disk causes loose abrasive particles to be radially displaced from the main regions of the junction between the drive disk and its cutting segments.

5. In a cutting disk as claimed in claim 4, the inner edge surface of at least one of said cutting segments having at least two spaced peripheral end regions which are at a different radial distance from the center of said disk than an inner edge surface region located centrally between said end regions thereof.

6. In a cutting disk for cutting hard abrasive material, a strong inner drive disk, a plurality of separated tooth-like abrasive cutting segments individually united to successive peripheral edge regions of said disk, the outer surface regions of each segment being arcuate to constitute a predetermined cutting envelope with consecutive cutting segments, the thickness of the disk being less than that of the transverse thickness of said cutting segments, the integral inner edge portions of consecutive arcuate sections of at least one of said segments having different radial dimensions thereby giving the inner edge surface of the one segment at least one eccentric edge irregularity with respect to said drive disk so that rotation of said disk causes loose abrasive particles to be radially displaced from the main regions of the junction between the drive disk and said one segment.

7. A cutting disk as claimed in claim 6, the shape of said inner edge surface being substantially straight in the direction perpendicular to the radius through the central portion of the associated cutting segment.

8. A cutting disk as claimed in claim 6, the shape of said inner edge surface being arcuate inwardly of the drive disk, with end sections thereof extending radially further from the disk center than that of the central section of the inner surface.

9. A cutting disk as claimed in claim 6, a substantial part of the radially inward side of said one segment being substantially devoid of abrasive components.

References Cited in the file of this patent

UNITED STATES PATENTS

| | | |
|---|---|---|
| 2,285,909 | Dawihl | June 9, 1942 |
| 2,358,460 | Kelleher | Sept. 19, 1944 |
| 2,405,086 | Bevillard | July 19, 1944 |
| 2,763,258 | Hughes | Sept. 18, 1956 |

FOREIGN PATENTS

| | | |
|---|---|---|
| 544,192 | Great Britain | Apr. 1, 1942 |